S. BAADER.
REVERSING GEAR.
APPLICATION FILED NOV. 25, 1913.
1,088,255.
Patented Feb. 24, 1914.
2 SHEETS—SHEET 2.
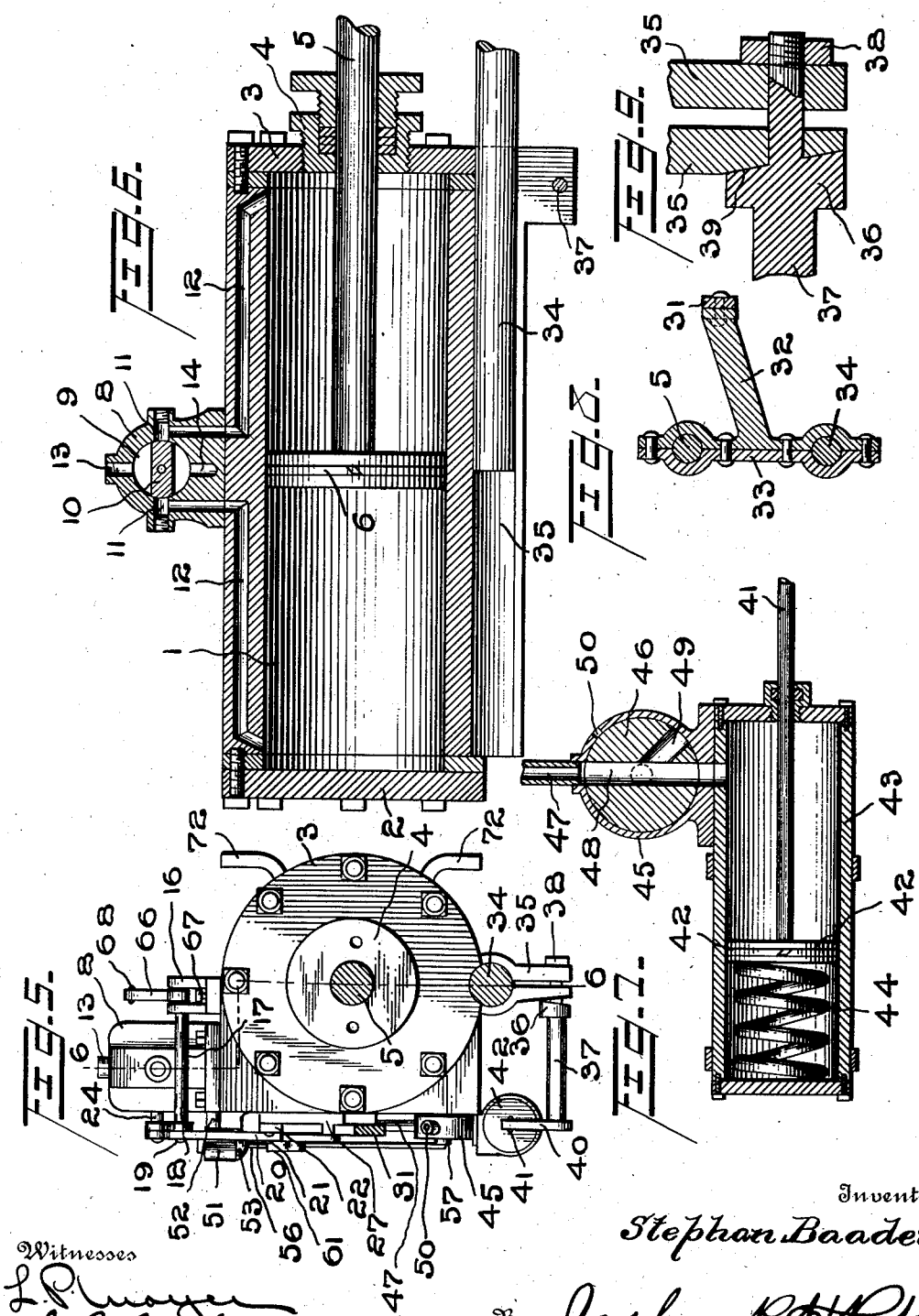
Witnesses
L. P. Moyer
C. R. Ziegler.
Inventor
Stephan Baader
By Joshua R. H. Potts.
Attorney

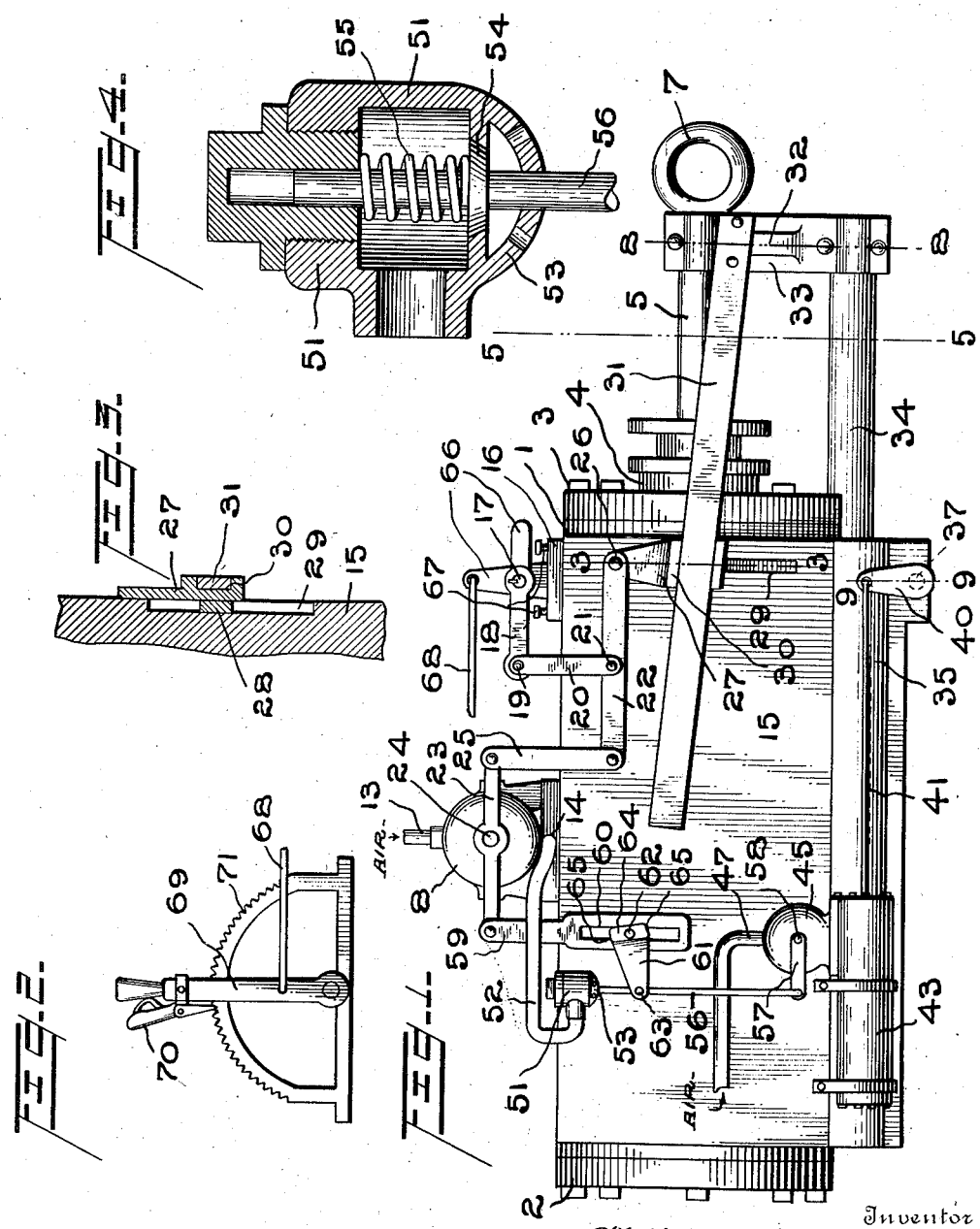

UNITED STATES PATENT OFFICE.

STEPHAN BAADER, OF PHILADELPHIA, PENNSYLVANIA.

REVERSING-GEAR.

1,088,255.  Specification of Letters Patent.  Patented Feb. 24, 1914.

Application filed November 25, 1913. Serial No. 802,885.

*To all whom it may concern:*

Be it known that I, STEPHAN BAADER, a citizen of the United States, residing at Philadelphia, in the county of Philadelphia and State of Pennsylvania, have invented certain new and useful Improvements in Reversing-Gears, of which the following is a specification.

My invention relates to improvements in reversing gears, the object of the invention being to provide an improved fluid operated mechanism for reversing the gear of a steam engine and primarily for use on locomotives.

A further object is to provide an improvement of this character which will automatically shut off the supply of fluid after each operation.

A further object is to provide an improved device of this character which positively locks the operating rod against movement and releases the rod only at such times as the fluid controlled mechanism is in operation, again locking the rod when the operation is free.

A further object is to provide a device of this character embodying an improved arrangement of links and levers operated to control the movement of an inlet valve, of an exhaust valve, and of a fluid locking device for the operating rod.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in elevation of a hand lever which may be utilized to open the inlet valve of my improved apparatus if desired. Fig. 3 is a broken view in section on the line 3—3 of Fig. 1. Fig. 4 is a view in longitudinal section on an enlarged scale illustrating the exhaust valve. Fig. 5 is a view in section on the line 5—5 of Fig. 1. Fig. 6 is a view in longitudinal section on the line 6—6 of Fig. 5. Fig. 7 is a view in longitudinal section on an enlarged scale illustrating the fluid locking mechanism. Fig. 8 is a view in section on the line 8—8 of Fig. 1, and Fig. 9 is a fragmentary view in section on an enlarged scale on the line 9—9 of Fig. 1, illustrating the rod clamping mechanism.

1 represents a cylinder which is closed at its ends by heads 2 and 3 respectively, the latter having a stuffing box 4 through which an operating rod 5 projects. This rod is secured to a piston 6 within cylinder 1, and at its outer end is provided with an eye 7 for connection with a link (not shown) of any approved link motion to cause the reverse of the engine as is commonly understood. This cylinder 1 will be located at any convenient point adjacent the link motion, and at a point removed from the engine cab and the movement of the piston 6 controlled by air or other fluid as will be hereinafter explained.

A valve chest 8 is secured to the top of cylinder 1, and has a cylindrical valve chamber 9 in which a rotary valve 10 is mounted. This valve 10 normally closes ports 11 in the valve chest which are connected by ducts 12 with the respective ends of the cylinder.

The fluid is supplied to the valve chest through an inlet port 13, and the fluid exhausts from the cylinder through an exhaust port 14, said ports being controlled by the movement of valve 10. Attention is particularly called to Fig. 6, in which it will be noted that the valve 10 has but a slight lap, so that the operation is almost instantaneous with the beginning of the movement of the valve.

The cylinder 1 is provided at one side with a flat plate 15 which may be cast integral with the cylinder if desired, and on which at one end, a bracket 16 is fixed. This bracket 16 supports a rocker shaft 17 having a rocker arm 18 secured thereto and connected by a pivot 19 with a depending link 20. The lower end of the link 20 is connected by a pivot 21 with a lever 22, the pivot 21 being located approximately midway between the ends of the lever 22. A rocking arm 23 is secured to the stem 24 of valve 10, and is connected at one end by a link 25 with one end of lever 22. The other end of lever 22 is connected by a pivot 26 with a depending block 27. This block 27 is provided on its inner face with a lug 28 which is guided vertically in a groove 29 in plate 15.

The outer face of the block 27 is provided with a groove 30 in which a cam bar 31 is movable. This cam bar 31 at its forward end is secured to an arm 32 fixed to a clamping yoke 33 which clamps the operating rod 5 and a rod 34 together. The rod 34 projects through a split clamp 35 which is normally held in clamped position by means of a cam 36 on a shaft 37 which extends through registering openings in the parallel members of the clamp, and is secured in place by a nut 38.

The cam 36 engages a cam surface 39 on one of the parallel members of the clamp as shown most clearly in Fig. 9, so that when the shaft 37 is turned in one position, the clamp is released, and when turned to another position, the clamp is operated to securely hold the rod 34 and consequently the rod 5 against movement. On the outer end of the shaft 37, a crank arm 40 is located, and is connected by a rod 41 with a piston 42 in a cylinder 43. A spring 44 is housed in the cylinder 43 back of the piston 42, and normally tends to move the crank arm 40 to release the clamp.

A valve casing 45 is secured to the cylinder 43 adjacent its end, and is provided with a rotary valve 46 controlling the flow of fluid to the cylinder. This valve 46 has an inlet port 48 which normally registers with the inlet pipe 47, so that air under pressure is admitted to the cylinder to overcome the spring 44 and hold the rod 34 in clamped position.

An exhaust port 49 is provided in valve 46, and an exhaust port 50 is provided in casing 45, so that when the valve is permitted to turn a pre-determined distance, the air can freely escape in the atmosphere and the spring 44 move the parts to release position.

An exhaust valve casing 51 is connected by a pipe 52 with the exhaust port 14 of valve chest 8, and the perforated bottom 53 of the valve casing 51 is normally closed by a valve 54 which is held upon its seat by a coiled spring 55 within the valve casing 51.

A relatively long rod 56 extends through the bottom 53, and operates as a valve stem, and at its lower end is connected to an arm 57 on the stem 58 of valve 46 so that the valves 54 and 46 operate in unison.

As above stated, one end of the rocking arm 23 is connected to link 25. The other end of this rocking arm is connected to a hanging link 59 having a longitudinal slot 60 therein. An arm 61 is pivotally supported on a pin 62 fixed to plate 15, and at its free end connected by a pivot 63 with rod 56.

An oblong enlargement 64 is made integral with the arm 61, and fits within the slot 60. In other words, this enlargement 64 is approximately the same lateral dimension as the slot, but the latter at certain points is provided with beveled or inclined recesses 65 which allow the enlargement to assume a position at an angle to the link as shown clearly in Fig. 1. When, however, the link 59 is moved longitudinally, the enlargement is forced out of the recesses 65 and assumes a position in the slot in alinement with the link, so that this movement of the enlargement causes the block 61 to pivot and move the rod 56 vertically, lifting the exhaust valve 54 and turning valve 46 to permit cylinder 43 to exhaust.

On the rocker shaft 17 above referred to, I secure an inverted T-shaped lever 66, and positioned beneath the horizontal members of this T-shaped lever, screws 67, which are adjustable in the bracket 16 and limit the turning movement of the rocker shaft. The upright member of this T-shaped lever 66 is connected by a rod 68 with any approved means for moving the same located within the engine cab. In Fig. 2 I illustrate a pivoted lever 69 which may be utilized for the purpose. This lever 69 will be relatively small, and provided with a detent 70 engaging a toothed segment 71 to hold the lever against movement.

On one side of the cylinder 1, I illustrate brackets 72 for securing the cylinder to its support, and it is to be understood that the cylinder will be located at the most convenient point on the engine.

When it is desired to reverse the engine, rocker shaft 17 is given a partial turn by means of the T-shaped lever 66, and its operating rod 68 which we will assume is operated by the lever 69. This movement of rocker shaft 17 causes the movement of rocker arm 18 and the longitudinal movement of link 20. This movement of link 20 swings lever 22 with the pivot 26 as a fulcrum, causing the link 25 to move longitudinally and through the medium of the rocking arm 23, turn valve 10 at an angle. This movement of the valve 10 will cause the live fluid to flow through one of the ports 12 and move the piston 6 longitudinally. At the same time, the exhaust from the other end of the cylinder will flow out through the other duct 12 through exhaust port 14 and pipe 52 into exhaust valve casing 51. The movement of rocking arm 23 as above explained causes the longitudinal movement of link 59 which compels the arm 61 to pivot and opens the exhaust valve 54. At the same time, the rod 56 turns the valve 46 to allow the fluid in front of piston 42 in cylinder 43 to escape and spring 44 forces the piston 42 and rod 41 in a direction to turn arm 40 and shaft 37 to release the clamp 35. This movement of the several parts is simultaneous so that as soon as pressure comes upon the piston 6 to move the same, the exhaust valve will be opened, and the rod 34 released so that the piston can move the rod 5 and cause the reversal of the engine through the medium of any approved link mechanism as is well understood. As the rod 5 moves in either direction, it will, through the medium of the cam bar 31, move block 27 vertically. This movement of block 27 causes the lever 22 to swing with the pivot 21 as a fulcrum and operates link 25 and rocking arm 23 to return the valve 10 to normal closed position, hence the air or other fluid is automatically shut off after the engine is reversed, so that as soon as the work of reversing is accomplished, the air is automatically shut off. This closing of the valve 9, returns the link 59 to its normal position, so that the arm 61 will assume the position shown in Fig. 1, and the spring 55 in casing 51 will return the valves 54 and 46 to their normal positions.

When the valve 46 is returned to normal, the air or other fluid will move the piston 42 and securely clamp the rod 34 and hold the latter against possibility of movement.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a reversing gear, the combination with a cylinder, a piston in the cylinder, and an operating rod connected to the piston and projecting through one end of the cylinder, of a valve controlling the flow of fluid to and from the cylinder, manually operated means for moving the valve to open position, and automatic means operated by the rod for returning the valve to closed position, substantially as described.

2. In a reversing gear, the combination with a cylinder, a piston in the cylinder, and an operating rod connected to the piston and projecting through one end of the cylinder, of a valve controlling the flow of fluid to and from the cylinder, manually operated means for moving the valve to open position, automatic means operated by the rod for returning the valve to closed position, and means automatically operated for locking the rod against movement when said valve is closed, substantially as described.

3. In a reversing gear, the combination with a cylinder, a piston in the cylinder, and an operating rod connected to the piston and projecting through one end of the cylinder, of a valve controlling the flow of fluid to and from the cylinder, manually operated means for moving the valve to open position, automatic means operated by the rod for returning the valve to closed position, means automatically operated for locking the rod against movement when said valve is closed, said last-mentioned means comprising a rod fixed to move with the operating rod, a clamp engaging the last-mentioned rod, and fluid controlled mechanism for operating the clamp, substantially as described.

4. The combination with a cylinder, a piston in the cylinder, and an operating rod secured to the piston and projecting through one end of the cylinder, of a valve controlling the flow of fluid to and from the cylinder, means for manually operating the valve to open the same, and automatic means for closing the valve, said automatic means comprising a cam bar movable longitudinally by the rod, and devices operated by the cam bar to close the valve, substantially as described.

5. The combination with a cylinder, a piston in the cylinder, and an operating rod secured to the piston and projecting through one end of the cylinder, of a valve controlling the flow of fluid to and from the cylinder, means for manually operating the valve to open the same, and automatic means for closing the valve, said automatic means comprising a cam bar movable longitudinally by the rod, a guide, a block movable in the guide and having a groove in which the cam bar is movable, and devices connecting the block with the valve, whereby the movement of the block by the cam bar compels the closing of the valve, substantially as described.

6. The combination with a cylinder, a piston in the cylinder, and an operating rod secured to the piston and projecting through one end of the cylinder, of a valve controlling the flow of fluid to and from the cylinder, a rod positioned parallel to the operating rod and fixed to move therewith, a clamp engaging said last-mentioned rod and normally holding the same against movement, a fluid pressure device controlling the operation of the clamp, and means operated by the opening movement of the valve to release the fluid control mechanism and permit the rods to move, substantially as described.

7. The combination with a cylinder, a piston in the cylinder, and an operating rod secured to the piston and projecting through one end of the cylinder, of a valve controlling the flow of fluid to and from the cylinder, a rod positioned parallel to the operating rod and fixed to move therewith, a clamp engaging said last-mentioned rod and normally holding the same against movement, a fluid pressure device controlling the operation of the clamp, a pivoted arm having an oblong enlargement thereon, said arm controlling the operation of the fluid controlled mechanism, and a hanging link moved by the movement of the valve, said link having a longitudinal slot therein with recesses in its opposite walls normally permitting said enlargement to assume a position in the slot at an angle to the link and moved into position in line with the link when said link is moved, substantially as described.

8. The combination with a cylinder, a piston in the cylinder, and an operating rod secured to the piston and projecting through one end of the cylinder, of a valve controlling the flow of fluid to and from the cylinder, a clamping yoke secured to the rod, a second rod parallel with the operating rod and secured to the clamping yoke, clamping means normally holding said last-mentioned rod against movement, and automatically released when the valve is moved to open position, and means operated by the longitudinal movement of the first-mentioned rod to automatically move the valve to closed position, substantially as described.

9. The combination with a cylinder, a piston in the cylinder, and an operating rod secured to the piston and projecting through one end of the cylinder, of a valve controlling the flow of fluid to and from the cylinder, a clamping yoke secured to the rod, a second rod parallel with the operating rod and secured to the clamping yoke, clamping means normally holding said last-mentioned rod against movement, and automatically released when the valve is moved to open position, a cam bar secured to the clamping yoke, and means operated by the cam bar for moving the valve to closed position, substantially as described.

10. The combination with a cylinder, a piston in the cylinder, and an operating rod secured to the piston and projecting through one end of the cylinder, of a valve controlling the flow of fluid to and from the cylinder, a clamping yoke secured to the rod, a second rod parallel with the operating rod and secured to the clamping yoke, clamping means normally holding said last-mentioned rod against movement, and automatically released when the valve is moved to open position, a cam bar secured to the clamping yoke, a block having movement in a determined path, said block having a groove in which the cam bar is movable, whereby the longitudinal movement of the cam compels the movement of the block, and means operated by the block for turning the valve to closed position, substantially as described.

11. The combination with a cylinder, a piston in the cylinder, and an operating rod secured to the piston and projecting through one end of the cylinder, of a valve controlling the flow of fluid to and from the cylinder, a spring-pressed exhaust valve, means for locking the rod against movement, said exhaust valve and said operating means operated simultaneously with the opening of the valve to open the exhaust valve and release the rod, and means operated by the longitudinal movement of the rod for automatically moving the valve to closed position, substantially as described.

12. The combination with a cylinder, a piston in the cylinder, and an operating rod secured to the piston and projecting through one end of the cylinder, of a valve controlling the flow of fluid to and from the cylinder, a spring-pressed exhaust valve, means for locking the rod against movement, said exhaust valve and said operating means operated simultaneously with the opening of the valve to open the exhaust valve and release the rod, and a cam bar secured to and movable with the rod, said cam bar constructed when moved longitudinally to move the valve to closed position, substantially as described.

In testimony whereof I have signed my name to this specification in the presence of two subscribing witnesses.

STEPHAN BAADER.

Witnesses:
M. E. DITTUS,
CHAS. E. POTTS.